A. BLOMQUIST.
AIR LIFTING JACK.
APPLICATION FILED APR. 10, 1918.
1,299,668.
Patented Apr. 8, 1919.
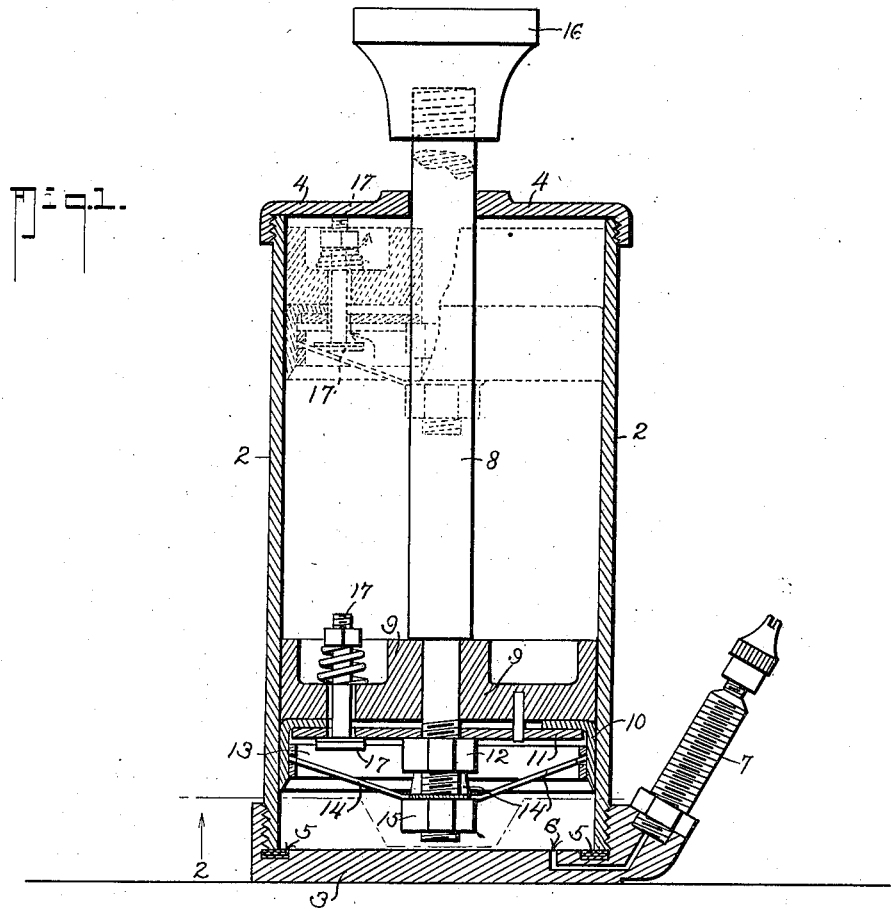
Fig. 1.
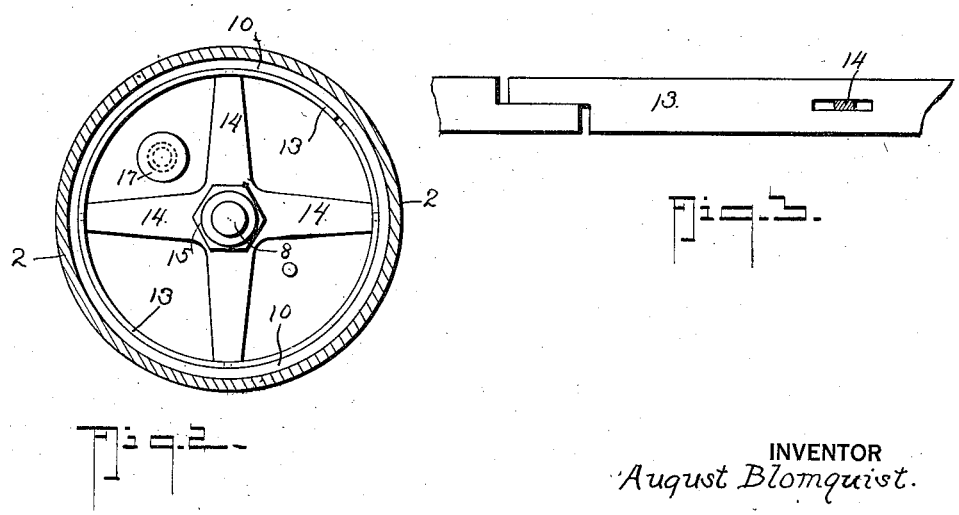
Fig. 2.
Fig. 3.
INVENTOR
August Blomquist.
BY
Fred J. Dieterich & Co.
ATTORNEYS

UNITED STATES PATENT OFFICE.

AUGUST BLOMQUIST, OF VANCOUVER, BRITISH COLUMBIA, CANADA.

AIR LIFTING-JACK.

1,299,668. Specification of Letters Patent. Patented Apr. 8, 1919.

Application filed April 10, 1918. Serial No. 227,739.

*To all whom it may concern:*

Be it known that I, AUGUST BLOMQUIST, a subject of the King of Sweden, residing at Vancouver, in the Province of British Columbia, Canada, have invented certain new and useful Improvements in Air Lifting-Jacks, of which the following is a specification.

This invention relates to a lifting jack wherein air under pressure is the lifting medium. It has been particularly designed for use in lifting automobiles where, as in garages and repair shops, a service of air under pressure is available, or where for use on the road a tire pump is obtainable.

The invention is particularly described in the following specification, reference being made to the drawings by which it is accompanied, in which:

Figure 1 being a vertical section through the jack.

Fig. 2 is a plan of the underside of the piston, and

Fig. 3, an enlarged detail of the expansible piston packing ring showing the connection of the spider frame arms thereto.

The device comprises a cylinder 2, preferably of wrought metal tubing, which is threaded at each end to joint into the bottom end or base 3 and the upper end cover 4. The base 3 is grooved at the end of the thread to receive a leather gasket 5 and is apertured as at 6 through the side and end for the air delivery. In the outer end of this delivery aperture 6 is removably attached an air check valve 7, such as is used on automobile tires.

The upper end cover 4 is centrally apertured to permit passage through it of the piston rod 8 to one end of which is secured the piston 9, and to the other the cap or head 16. The rim of this piston 9 is upwardly flanged to afford an effective supporting area to the lower end of the piston rod and a cupped leather packing ring 10 is secured to its under face by a washer plate 11 and nut 12 on the reduced end of the piston rod 8.

To insure that the flange of the packing ring 10 is brought effectively into sealing engagement with the bore of the cylinder an expansible spring ring 13 bears circumferentially on the inner side of the leather ring 10, which spring ring is apertured to receive the ends of the radial arms of a light sheet metal spider frame 14, the radial arms of which are angled slightly upward from the center which fits over the threaded end of the piston rod, and is extended outward by a nut 15 thereon. The spider 14 can be expanded for screwing the nut 15 and thus serves to expand the ring 13 and packing 10.

An aperture is provided through the piston 9 and washer plate 11, which aperture is normally closed by a valve 17 having a fiber seat on the underside of the washer plate 11. The stem of this valve passes through the piston 9 and projects slightly beyond the upper edge of it. This valve is normally held in the closed position by a spring and nut on the stem. Before the piston reaches the upper end of the cylinder the upper end of the valve stem encounters the end cover 4 and the valve 17 is pressed open to allow the air to escape before the piston reaches the upper limit of its movement.

The device forms a simple and convenient lifting jack, which, not being subject to disturbing pressures when being extended, as is the case with rack and gear operated jacks, can be made very light and portable.

Having now particularly described my invention, I hereby declare that what I claim as new and desire to be protected in by Letters Patent, is:

An air lifting jack comprising a tubular cylinder closed at its lower end and having an air delivery aperture through the side of the end, a delivery pipe connection provided with a check valve in the outer end of this aperture, the cylinder having a closed upper end which is centrally apertured, a piston rod passing through said aperture, a piston, said rod having a shank of reduced diameter passing through said piston and providing a shoulder against which the piston rests, a packing ring beneath the piston cupped downwardly, said shank being threaded, a plate on said shank and a nut on said shank for securing said packing to the piston, a second nut on said shank, a spider on said shank, an expansion ring within the packing and sustained by said spider, said piston and said packing plate having an aperture and a one way valve for closing said aperture, all being arranged substantially as shown and for the purposes described.

In testimony whereof I affix my signature.

AUGUST BLOMQUIST.